United States Patent
Watanabe

(10) Patent No.: US 12,360,362 B2
(45) Date of Patent: Jul. 15, 2025

(54) OPTICAL SCANNING DEVICE

(71) Applicant: STANLEY ELECTRIC CO., LTD., Tokyo (JP)

(72) Inventor: Tadashi Watanabe, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 473 days.

(21) Appl. No.: 17/922,322

(22) PCT Filed: Mar. 19, 2021

(86) PCT No.: PCT/JP2021/011400
§ 371 (c)(1),
(2) Date: Oct. 28, 2022

(87) PCT Pub. No.: WO2021/240965
PCT Pub. Date: Dec. 2, 2021

(65) Prior Publication Data
US 2023/0168490 A1    Jun. 1, 2023

(30) Foreign Application Priority Data
May 25, 2020    (JP) .................................. 2020-090522

(51) Int. Cl.
*G02B 26/08*    (2006.01)
*G02B 26/10*    (2006.01)
*H02N 2/14*    (2006.01)

(52) U.S. Cl.
CPC ....... *G02B 26/101* (2013.01); *G02B 26/0858* (2013.01); *H02N 2/14* (2013.01)

(58) Field of Classification Search
CPC ..... G02B 26/101; G02B 26/0858; H02N 2/14
See application file for complete search history.

(56) References Cited

U.S. PATENT DOCUMENTS

2010/0195180 A1    8/2010    Akanuma et al.
2014/0355088 A1    12/2014    Yasuda et al.
(Continued)

FOREIGN PATENT DOCUMENTS

CN    108761773 A    11/2018
JP    2008178173 A    7/2008
(Continued)

OTHER PUBLICATIONS

International Search Report (ISR) (and English translation thereof) dated Jun. 1, 2021, issued in International Application No. PCT/JP2021/011400.
(Continued)

*Primary Examiner* — Euncha P Cherry
(74) *Attorney, Agent, or Firm* — Holtz, Holtz & Volek PC

(57) ABSTRACT

An optical scanning device includes an optical deflector, a driving unit, and a detection unit. The optical deflector has a mirror part and an H actuator. The driving unit supplies both of a first driving voltage and a second driving voltage to a first set of piezoelectric divided sections and a second set of piezoelectric divided sections of the H actuator during a first driving period, and supplies the driving voltage only to one set out of the first set and the second set of piezoelectric divided sections during a second driving period. The detection unit detects a deflection angle γ based on the output voltage of the other set of piezoelectric divided sections during the second driving period.

6 Claims, 11 Drawing Sheets

(56) References Cited

U.S. PATENT DOCUMENTS

2018/0314059 A1* 11/2018 Yamada ............... G02B 26/101
2020/0026067 A1* 1/2020 Sakurai ............... G02B 26/101

FOREIGN PATENT DOCUMENTS

| JP | 4984117 B2 | 5/2012 |
| JP | 2012154989 A | 8/2012 |
| JP | 5493735 B2 | 3/2014 |
| JP | 6092713 B2 | 2/2017 |

OTHER PUBLICATIONS

Written Opinion dated Jun. 1, 2021, issued in International Application No. PCT/JP2021/011400.

* cited by examiner

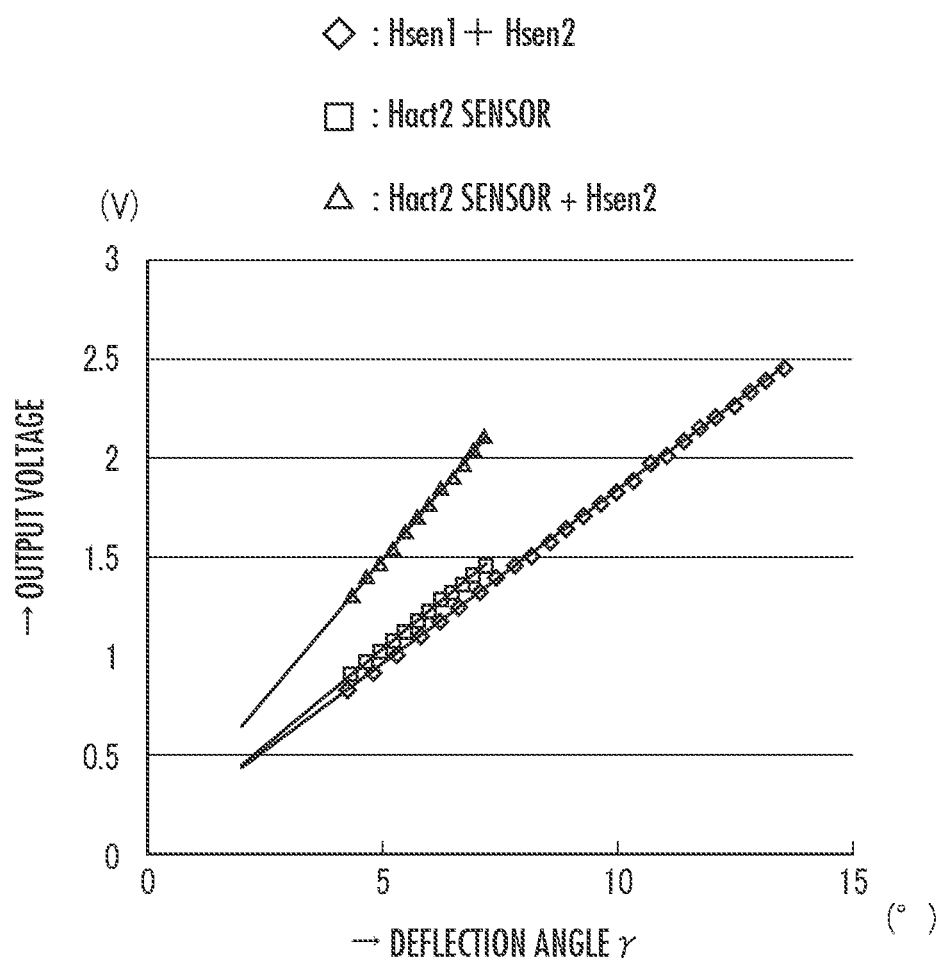

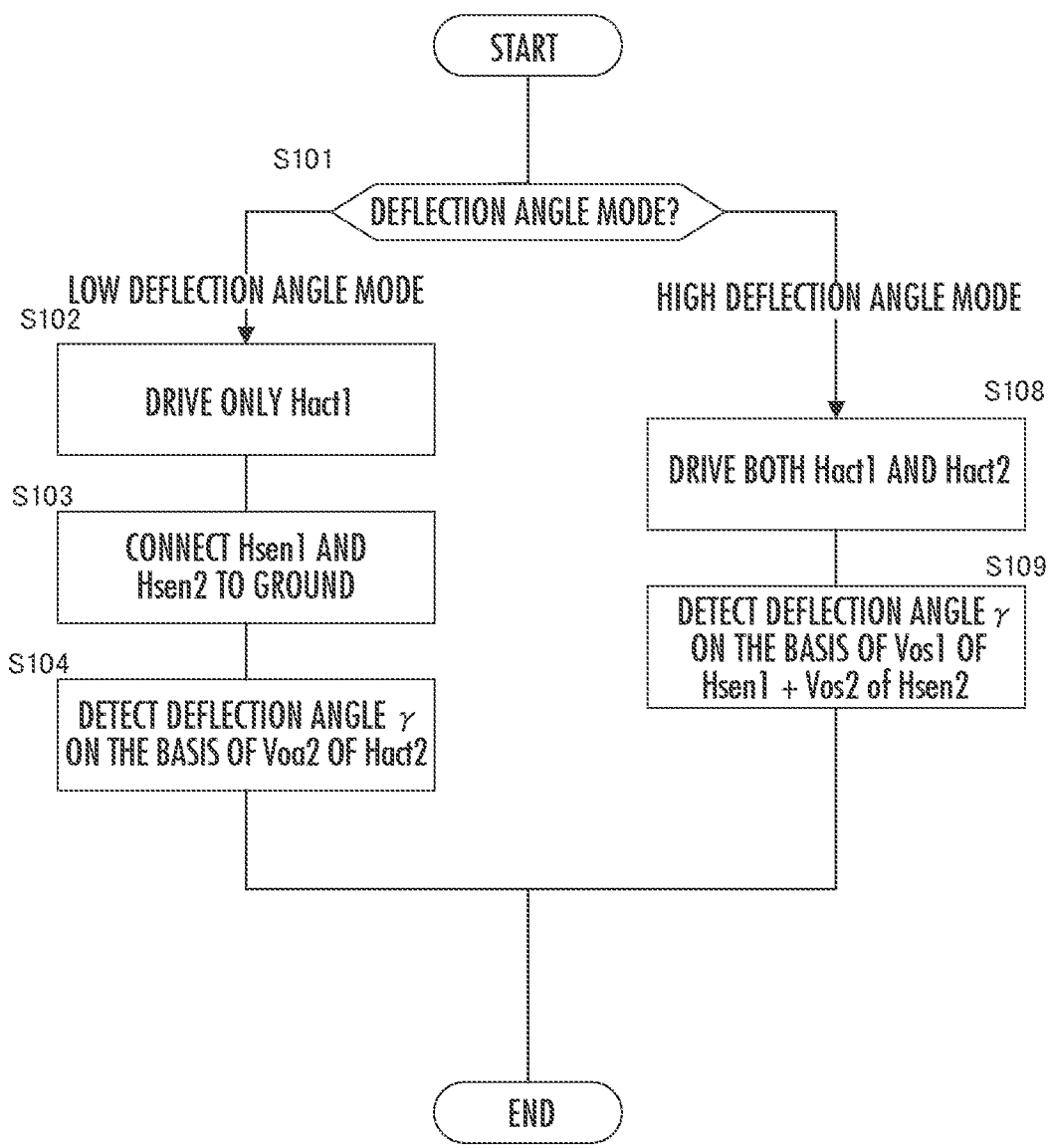

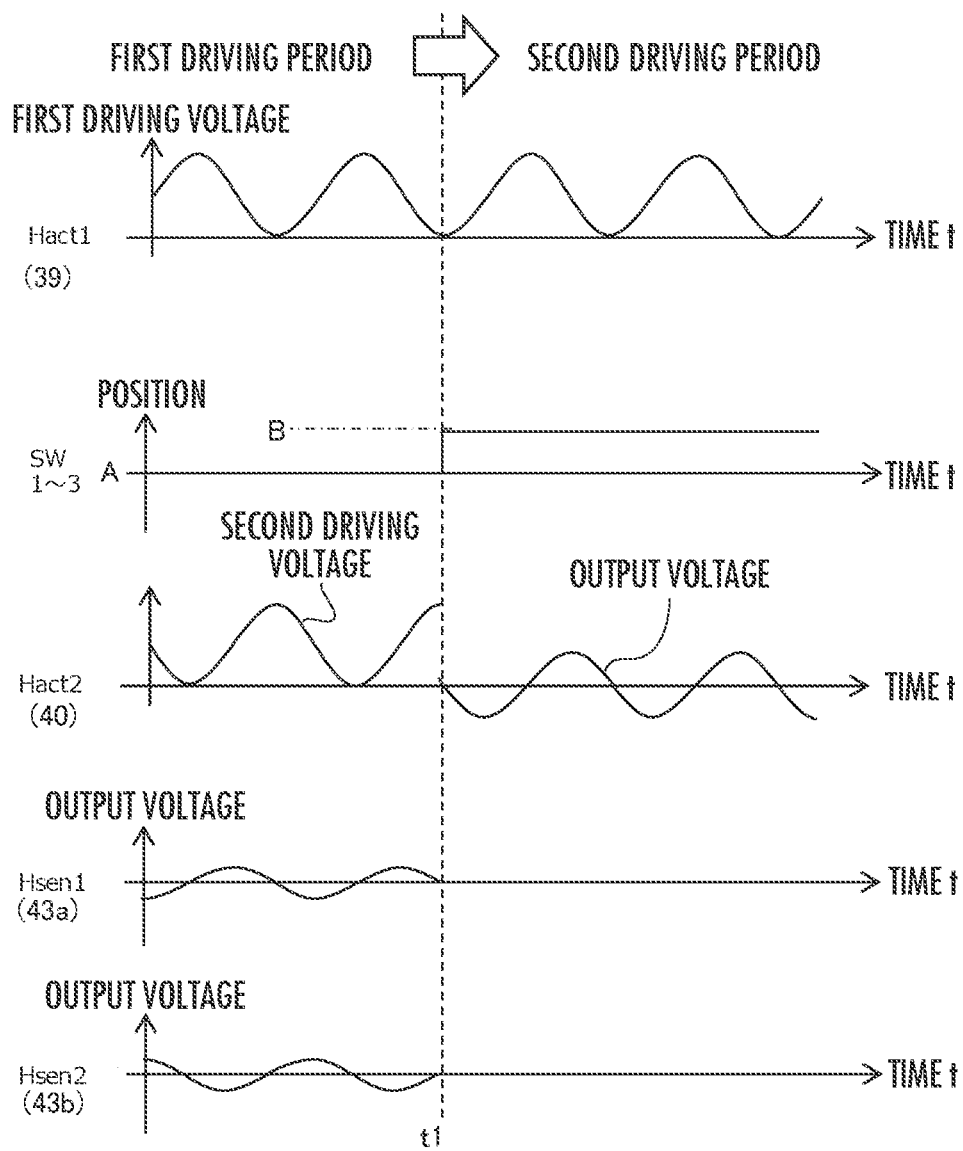

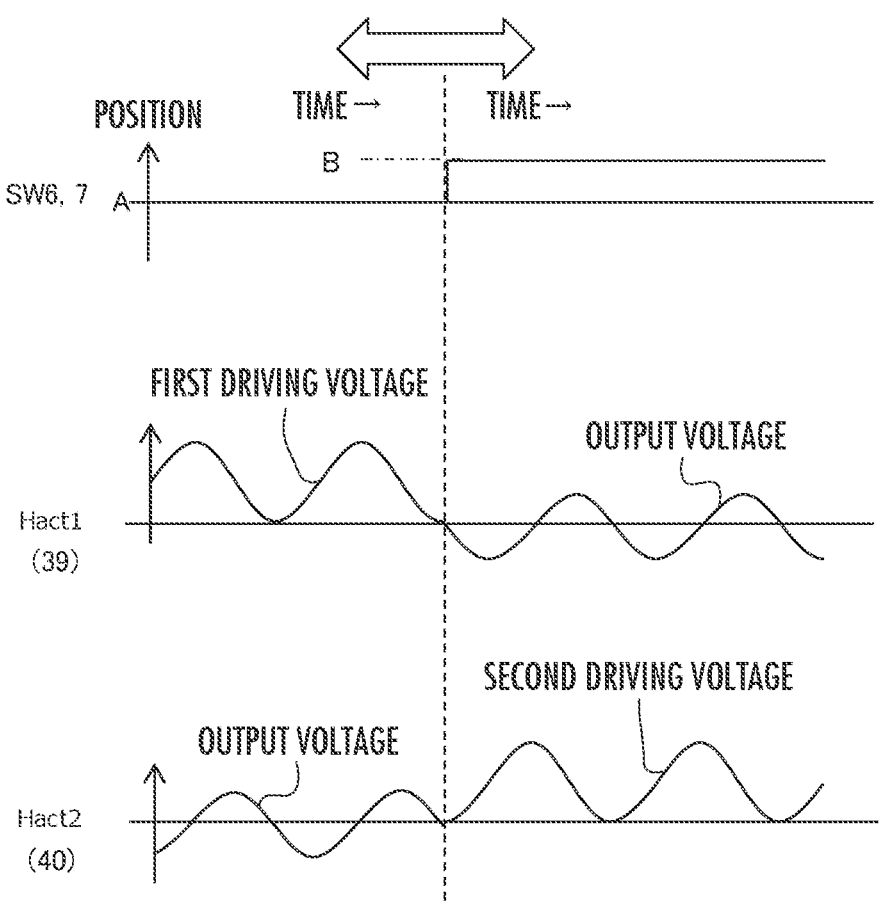

OPTICAL SCANNING DEVICE

TECHNICAL FIELD

The present invention relates to an optical scanning device provided with an optical deflector.

BACKGROUND ART

In an optical scanning device provided with a MEMS (Micro Electro Mechanical Systems) optical deflector, a light beam from a light source is irradiated onto a mirror part, which rotates about an axis in a reciprocating manner, and a scanning light beam is emitted from the mirror part. In order to accurately control the direction in which the scanning light beam from the mirror part is emitted, it is necessary to accurately detect the deflection angle of the mirror part about the axis.

Patent Literature 1 discloses a MEMS single-axis scanning optical deflector. In this optical deflector, cantilevers are coupled from both sides to a torsion bar protruding along a rotation axis from a mirror part. Each cantilever is longitudinally divided into two piezoelectric divided sections, one of which is a piezoelectric divided section acting as a piezoelectric actuator and the other is a piezoelectric divided section acting as a piezoelectric sensor for detecting deflection angles.

Patent Literature 2 discloses a MEMS two-axis scanning optical deflector. In this optical deflector, a pair of semi-annular piezoelectric actuators are each provided on each side of a rotation axis, and coupled from each side at the same position in the longitudinal direction of a torsion bar to annularly surround a mirror part. Each of the semi-annular piezoelectric actuators is composed of one piezoelectric actuator, and the semi-annular piezoelectric actuators on the sides are driven by driving voltages having phases opposite from each other so as to rotate the mirror part about the rotation axis in a reciprocating manner via a torsion bar.

Patent Literature 3 discloses a MEMS single-axis scanning optical deflector. In this optical deflector, an annular piezoelectric body surrounds a mirror part and is coupled, on the rotation axis of the mirror part, to an intermediate portion of each torsion bar protruding from the mirror part along a rotation axis. The annular piezoelectric body has three piezoelectric divided sections, namely, a central piezoelectric divided section and piezoelectric divided sections at both ends, on each side half relative to the rotation axis. Each central piezoelectric divided section is driven by a driving voltage having an opposite phase to rotate the mirror part about the rotation axis in a reciprocating manner via the torsion bar. Meanwhile, the piezoelectric divided sections on both ends on the same side relative to the rotation axis act as piezoelectric sensors and the outputs thereof are added, and the deflection angle of the mirror part about the rotation axis is detected on the basis of the added output.

CITATION LIST

Patent Literatures

Patent Literature 1: Japanese Patent No. 5493735
Patent Literature 2: Japanese Patent No. 4984117
Patent Literature 3: Japanese Patent No. 6092713

SUMMARY OF INVENTION

Technical Problem

In the case of the optical deflectors of Patent Literatures 1 and 3, a sufficient output voltage of the piezoelectric divided sections of the piezoelectric sensor is secured when the deflection angle of the mirror part about the rotation axis is large. However, as the deflection angle of the mirror part about the rotation axis decreases, the output voltage of the piezoelectric divided sections of the piezoelectric sensor decreases. This results in insufficient detection accuracy for a small deflection angle.

An object of the present invention is to provide an optical scanning device adapted to obtain a sufficient output voltage even when the deflection angle of a mirror part about a rotation axis is small, thus making it possible to detect a deflection angle with high accuracy without adding a special piezoelectric sensor.

Solution to Problem

An optical scanning device in accordance with the present invention includes:
  an optical deflector which has a mirror part, a support part, and a plurality of piezoelectric divided sections coupled in series, and includes a piezoelectric actuator which is interposed between the support part and the mirror part and rotates the mirror part about a rotation axis in a reciprocating manner;
  a driving unit which supplies a first driving voltage and a second driving voltage to a first set and a second set of piezoelectric divided sections so as to provide a relationship of opposite phases from each other in the case where the plurality of piezoelectric divided sections are divided alternately into the first set and the second set in an arrangement order toward an acting end from a proximal end of the optical deflector; and
  a detection unit that detects a deflection angle of the mirror part about the rotation axis,
  wherein the driving unit
  supplies a driving voltage to both the first set and the second set of piezoelectric divided sections during a first driving period, and
  supplies a driving voltage only to one of the first set and the second set of piezoelectric divided sections during a second driving period, and
  the detection unit detects the deflection angle based on an output voltage of the other set of piezoelectric divided sections during the second driving period.

According to the present invention, the driving voltage is supplied only to the first set of piezoelectric divided sections to perform an operation during the second driving period in which the deflection angle about the rotation axis is decreased, while the second set of piezoelectric divided sections is used as a piezoelectric sensor. Thus, without adding a special piezoelectric sensor, a sufficient output voltage is obtained even when the deflection angle of the mirror part about the rotation axis is small, thus making it possible to achieve highly accurate detection of the deflection angle.

Preferably, in the optical scanning device in accordance with the present invention,
  the support part annularly surrounds the mirror part,
  the optical deflector has a pair of torsion bars which protrude from both sides of the mirror part and are coupled to the support part, and
  the piezoelectric actuator is an annular piezoelectric actuator which annularly surrounds the mirror part on an inner peripheral side of the support part, is coupled to an intermediate portion of the pair of torsion bars on a first axis serving as the rotation axis, and is coupled to the support part on a second axis orthogonal to the first axis at a center of the mirror part.

According to the configuration, a rotational force is imparted to each torsion bar from both sides relative to the first axis during the second driving period. This makes it possible to stabilize the reciprocating rotation during a low deflection angle period.

Preferably, the optical scanning device in accordance with the present invention further includes:

a pair of piezoelectric sensors placed so as to sandwich the first axis from both sides on at least one coupling portion of coupling portions of the annular piezoelectric actuator coupled to the pair of torsion bars, and the detection unit detects the deflection angle based on output voltages of the pair of piezoelectric sensors during the first driving period.

According to the configuration, during the first driving period, the driving voltages of both the first and the second sets can be used to secure a large deflection angle width of the mirror part, and the deflection angle can be detected by a sufficient output voltage from the pair of piezoelectric sensors.

Preferably, in the optical scanning device in accordance with the present invention, the detection unit detects the deflection angle based on a sum of an output voltage of the other set of piezoelectric divided sections and a pair of output voltages of the pair of piezoelectric sensors during the second driving period.

According to the configuration, during the second driving period, the deflection angle is detected based on the sum of the output voltage of the other set of piezoelectric divided sections and the pair of output voltages of the pair of piezoelectric sensors, so that the output voltage based on which the deflection angle is detected during the second driving period can be further increased.

Preferably, the optical scanning device in accordance with the present invention further includes:

a connection switching unit which connects an output terminal of at least one of the pair of piezoelectric sensors to ground during the second driving period.

According to the configuration, the output terminal of the piezoelectric sensor is connected to ground during the second driving period. This makes it possible to prevent electric charges from accumulating in a piezoelectric sensor not in use during the second driving period.

Preferably, in the optical scanning device in accordance with the present invention, the connection switching unit alternately switches the other set between the first set and the second set during the second driving period.

According to the configuration, the other set of piezoelectric divided sections is alternately switched between the first set and the second set during the second driving period thereby to cause all piezoelectric divided sections to equally pause, thus making it possible to improve the life of the piezoelectric actuator.

BRIEF DESCRIPTION OF DRAWINGS

FIG. 4 is a graph illustrating the relationship between deflection angle γ of a mirror part about a first axis and output voltage;

FIG. 5 is a flowchart of the detection method for the deflection angle γ in the optical scanning device;

FIG. 7 presents the waveform diagrams of the first driving period and the second driving period in the external circuit in which the low deflection angle mode is set to the low deflection angle mode 1;

FIG. 11 is a waveform diagram of the circuit of FIG. 10.

DESCRIPTION OF EMBODIMENTS

Figure 1:
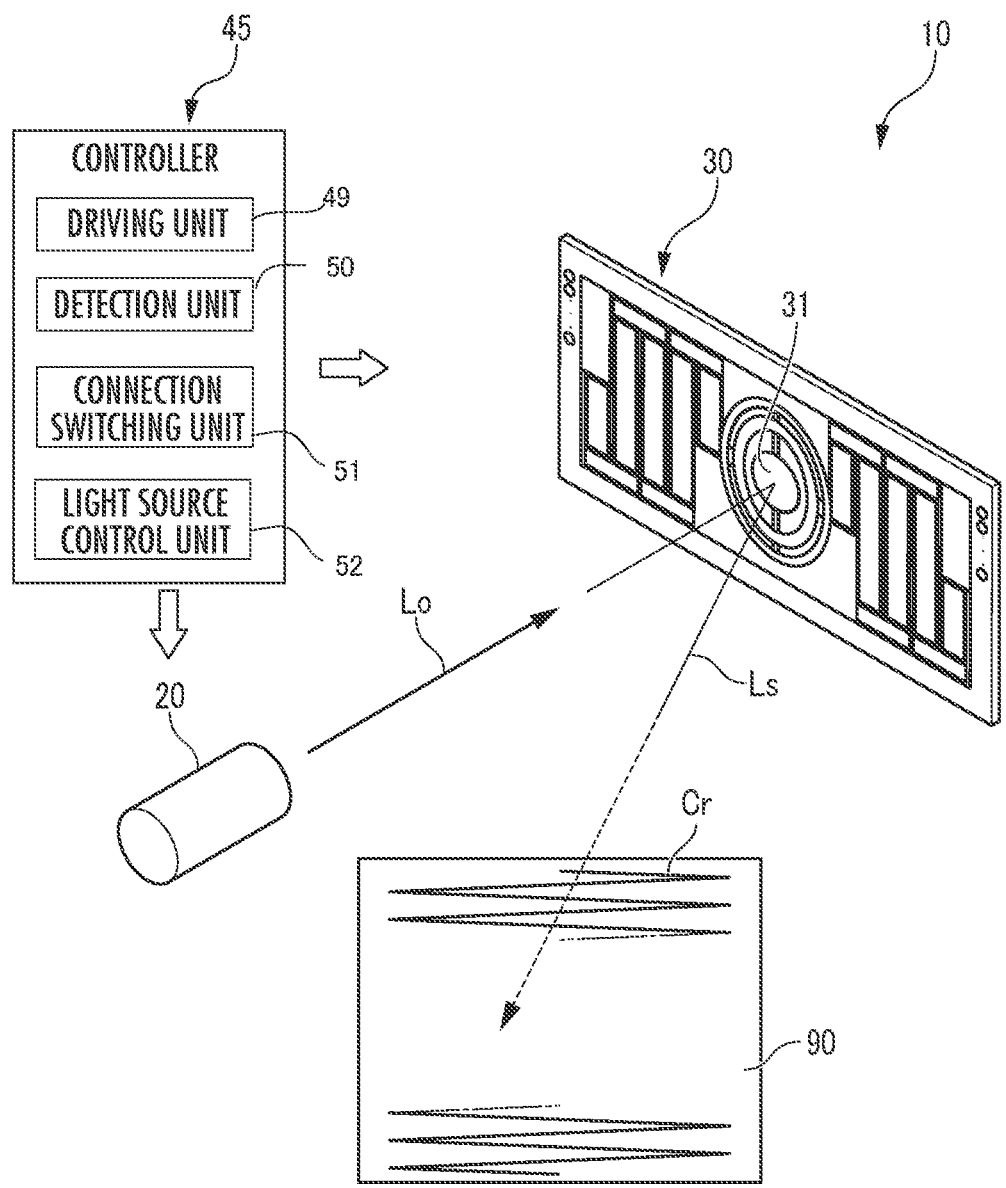
FIG. 1 is a schematic diagram of an entire optical scanning device.

The following will describe preferred embodiments of the present invention. It is needless to say that the present invention is not limited to the embodiments described below. The present invention is implemented in various forms within the scope of the technical concept disclosed in the specification. Components that are common among the embodiments are assigned the same reference numerals.

(Optical Scanning Device)

FIG. 1 is a schematic diagram of an entire optical scanning device 10. The optical scanning device 10 includes a laser light source 20, an optical deflector 30, and a controller 45.

FIG. 1 illustrates a screen 90, but the screen 90 is excluded from the elements constituting the optical scanning device 10. The screen 90 is only illustrated for the convenience of explaining a scanning trajectory Cr of a scanning light beam Ls emitted from the optical scanning device 10. The screen 90 may be an image screen or an illumination area in front of a vehicle, depending on a product such as an imaging device or a vehicle headlight in which the optical scanning device 10 is incorporated.

The height and the width of the screen 90 correspond to a vertical (V) direction and a horizontal (H) direction, respectively. In the following embodiments, elements and the like with V or H attached to element names and factor names mean association with the vertical direction and the horizontal direction, respectively, among directions.

The laser light source 20 emits a laser light beam Lo to a mirror part 31 of the optical deflector 30. The mirror part 31 emits a scanning light beam Ls generated by reflecting the laser light beam Lo.

The mirror part 31 rotates in a reciprocating manner resonantly and non-resonantly about two axes, namely, a first axis and a second axis, which are orthogonal to each other. In this embodiment, an H-axis and a V-axis correspond to the first axis and the second axis, respectively. The scanning light beam Ls generates the scanning trajectory Cr on the screen 90 by raster scanning.

The controller 45 includes a driving unit 49, a detection unit 50, a connection switching unit 51, and a light source control unit 52. The light source control unit 52 controls switching between lighting and extinguishing of the laser light source 20 and the power supply amount (luminous intensity of the laser light beam Lo) when the laser light source 20 is turned on. The driving unit 49, the detection unit 50, and the connection switching unit 51 will be described in detail later.

(Optical Deflector)

Figure 2:
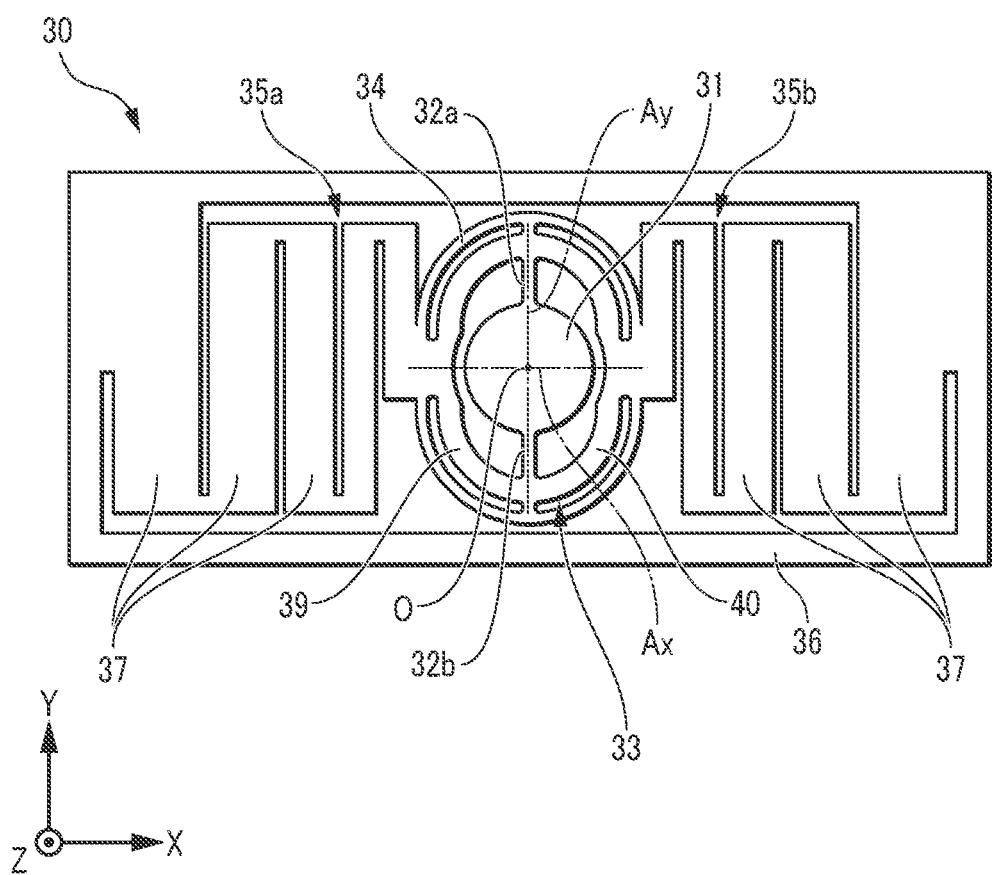
FIG. 2 is a front view of an optical deflector.

FIG. 2 is a front view of the optical deflector 30. Here, for the convenience of explaining the configuration of the light deflector 30, a three-axis coordinate system will be defined. An X-axis and a Y-axis are axes parallel to the horizontal direction and the vertical direction, respectively, when the optical deflector 30 is viewed from the front. A Z-axis is an axis parallel to the thickness direction of the MEMS optical deflector 30.

The optical deflector 30 includes the mirror part 31, a pair of torsion bars 32a and 32b, an H actuator, a movable frame 34, a pair of V actuators 35a and 35b, and a fixed frame 36.

The mirror part 31 is circular, and the laser light beam Lo (FIG. 1) is incident on a center O of the mirror part 31. The first axis and the second axis as the two rotation axes of the mirror part 31 of the optical deflector 30, which is a two-axis optical deflector, are parallel to the Y-axis and the X-axis, respectively, and orthogonal to each other at the center O when the mirror part 31 is stationary.

An annular H actuator 33 and the annular movable frame 34 surround the mirror part 31 in order from the inner side. The torsion bars 32a and 32b extend along the first axis on both sides of the mirror part 31, and are coupled to the peripheral edge of the mirror part 31 and the inner periphery of the H actuator 33 at both ends. The annular H actuator 33 is coupled to an intermediate portion of a torsion bar 32 (the generic term of the torsion bar 32a and the torsion bar 32b).

Upon reception of an H driving voltage (a first driving voltage) supplied, the H actuator 33 causes the mirror part 31 to resonate about the first axis at a resonant frequency (e.g., 15 kHz) through the torsion bar 32. The H actuator 33 has a first set 39 and a second set 40 as the sets of piezoelectric divided sections. The first set 39 and the second set 40 will be described in detail with reference to FIG. 3.

The V actuators 35a and 35b are positioned on both sides relative to the movable frame 34 in the X-axis direction. Each V actuator 35 (the generic term of the V actuators 35a and 35b) is interposed between the outer periphery of the movable frame 34 and the inner periphery of the fixed frame 36. Each V actuator 35 has a plurality of cantilevers 37 coupled in series in parallel to the Y-axis direction and in a meandering arrangement.

When the plurality of cantilevers 37 in each V actuator 35 are numbered in order from the fixed frame 36 side to the movable frame 34 side in the X-axis direction, V driving voltages which have the same amplitude and frequency but are shifted by 180° in phase (opposite phases from each other) are supplied to the cantilevers 37 that are odd-numbered and the cantilevers 37 that are even-numbered.

The frequency of the V driving voltage is set to a non-resonant frequency (e.g., 60 Hz) and set to a value that is significantly lower than the resonant frequency of the reciprocating rotation of the mirror part 31 about the first axis. Thus, the mirror part 31 rotates in a reciprocating manner about the second axis (non-resonance axis) in non-resonance. In this embodiment, the H actuator 33 and the V actuator 35 are both unipolar piezoelectric actuators.

(H Actuator)

Figure 3:
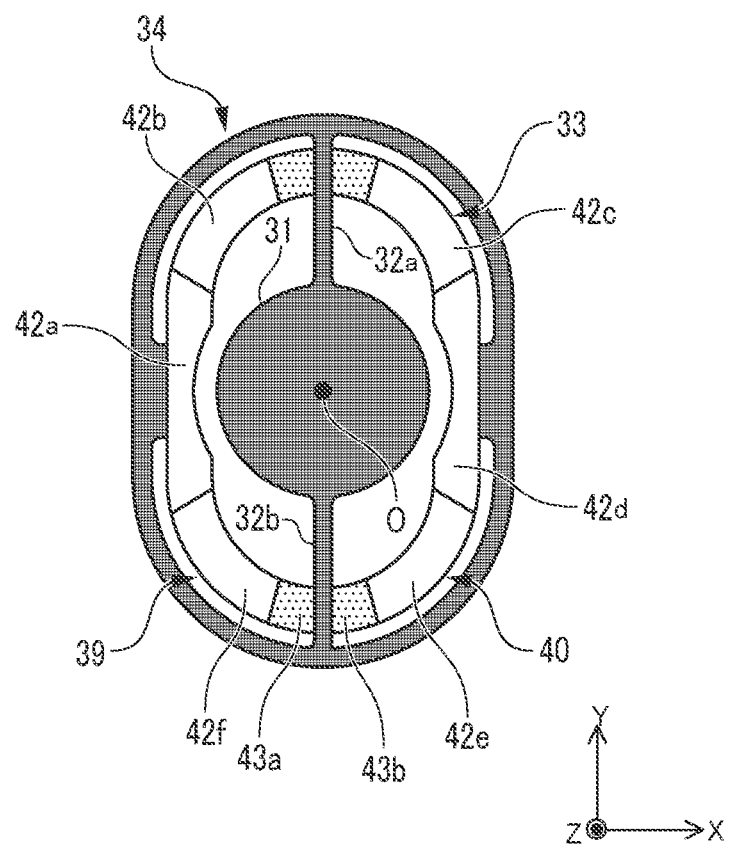
FIG. 3 is a detailed view of an H actuator.

FIG. 3 is a detailed view of the H actuator 33. The H actuator 33 is formed in an elliptical shape elongated in the Y-axis direction (e.g., the track shape of an athletics stadium), and has a symmetrical shape with the first axis parallel to the Y-axis as a symmetry axis.

The H actuator 33 is coupled to an intermediate portion of the torsion bar 32 at two locations that intersect with the first axis. The coupled portions function as working ends of the H actuator 33. The H actuator 33 further intersects with the second axis at two locations, and is coupled to the inner periphery of the movable frame 34 on the outer peripheral side of the intersection locations. The coupled portions function as the proximal ends of the H actuator 33.

Before describing the laminate structure of the H actuator 33, the laminate structure of the MEMS optical deflector 30, which is the premise thereof, will be described. The optical deflector 30 is formed by depositing three layers, namely, a lower electrode layer, a piezoelectric film layer, and an upper electrode layer, in order from the bottom on a surface of a SOI substrate. After that, these three layers are removed by etching in areas other than the piezoelectric actuator, thereby completing the optical deflector 30. A plurality of the optical deflectors 30 are cut out by dicing a single SOI substrate.

The SOI is composed of five layers, namely, a rear surface oxide film layer, a handling Si layer, an oxide film layer, an upper Si layer, and a front surface oxide film layer, in order from the bottom. Except for the H actuator 33 and the V actuator 35, the three layers, namely, the lower electrode layer, the piezoelectric film layer and the upper electrode layer, are removed by etching. Further, in the region of the H actuator 33 and the V actuator 35, the two layers on the rear side of the SOI substrate are removed by etching from the rear surface side, and the upper three layers constitute the substrate part.

The H actuator 33 has proximal ends, one for each side relative to the symmetry axis, i.e., the first axis. The H actuator 33 has a total of six piezoelectric divided sections 42a, 42b, 42c, 42d, 42e, and 42f (hereinafter abbreviated as "the piezoelectric divided section 42a to the piezoelectric divided section 42f") arranged in this order clockwise from the proximal end adjacent to the V actuator 35a.

The total six piezoelectric divided section 42a to the piezoelectric divided section 42f are arranged symmetrically with respect to the first axis, thus resulting in the same number of piezoelectric divided sections on each side with respect to the first axis. The plurality of piezoelectric divided sections are alternately grouped into the first set and the second set in circumferential order. The three piezoelectric divided sections 42a, 42c, and 42e constitute the first set 39, and the three piezoelectric divided sections 42b, 42d, and 42f constitute the second set 40. As illustrated in FIG. 3, the first set and the second set have the same total area, and the balance of the arrangement of each piezoelectric divided section in the whole is equal in both sets. Consequently, the mirror can be symmetrically rotated in the horizontal direction simply by driving the piezoelectric divided sections (the three divided sections) of one of the sets. In addition, the first set and the second set can be individually operated. When individually operating the first set and the second set, if the driving voltage supplied to the first set and the driving voltage supplied to the second set are set to be the same, then the rotational angle and the rotational frequency of the mirror about the first axis will be the same.

The driving unit 49 supplies a first driving voltage to the first set 39 of piezoelectric divided sections, and supplies a second driving voltage to the second set 40 of piezoelectric divided sections. The first driving voltage and the second driving voltage have the same frequency, waveform and bias voltage except that the phases thereof are opposite to each other.

The piezoelectric divided section 42a to the piezoelectric divided section 42f have the laminate structure that includes the three-layer upper structure composed of the lower electrode layer, the piezoelectric film layer, and the upper electrode layer, on the front surface side of the substrate layer composed of the upper three layers of the SOI described above. In the piezoelectric divided section 42a to the piezoelectric divided section 42f, a division groove, which separates the upper electrode layer and the piezoelectric film layer, is formed between the piezoelectric divided sections that are adjacent to each other in the circumferential direction. This prevents the piezoelectric divided sections that are adjacent to each other in the circumferential direction from short-circuiting.

Piezoelectric sensors 43a and 43b are formed in a region where the piezoelectric sensors 43a and 43b sandwich the intersection with the torsion bar 32b from both sides in the H actuator 33. A piezoelectric sensor 43 (the generic term of the piezoelectric sensors 43a and 43b) is positioned between the piezoelectric divided section 42e and the piezoelectric divided section 42f in the circumferential direction, and generates an output voltage that is different from that of the piezoelectric divided section 42a to the piezoelectric divided section 42f. Further, both of the piezoelectric sensors 43a and 43b are smaller in area than the piezoelectric divided section 42a to the piezoelectric divided section 42f.

The first set 39 and the second set 40 receive the first driving voltage and the second driving voltage, respectively, which have phases opposite from each other, as described above. Consequently, the first set 39 and the second set 40 curvedly deform in phases opposite from each other, and the H actuator 33 rotates the mirror part 31 about the first axis in a reciprocating manner through the torsion bar 32. The H actuator 33 has both the first set 39 and the second set 40 on each side with respect to the first axis, thus making it possible to increase the deflection angle width about the first axis.

The piezoelectric sensors 43a and 43b curvedly deform in the same phase as the set of piezoelectric divided sections that is not adjacent in the circumferential direction on the H actuator 33, and generate an output voltage according to the amount of deformation. The output voltage of the piezoelectric sensor 43 is sent to the detection unit 50.

(Diverting the H Actuator to the Piezoelectric Sensor)

FIG. 4 is a graph illustrating the relationship between the deflection angle γ of the mirror part 31 about the first axis and each output voltage. In FIG. 4, deflection angle γ=0° is defined as the deflection angle when the mirror part 31 faces directly in front of the optical deflector 30. The horizontal axis of FIG. 4 indicates the deflection angle γ of one side of the mirror part 31 with respect to the direct frontal direction of the optical deflector 30. The optical deflector 30 has a symmetrical configuration with respect to the first axis, so that the same relationship holds for the deflection angle γ of the other side of the mirror part 31 with respect to the direct frontal direction of the optical deflector 30.

In the drawings from FIG. 4 and after, the definitions of the abbreviations are as follows:
Hact1: the first set 39
Hact2: the second set 40
Hact1 sensor: the first set 39 diverted to the piezoelectric sensor
Hact2 sensor: the second set 40 diverted to the piezoelectric sensor
Hsen1: piezoelectric sensor 43a
Hsen2: piezoelectric sensor 43b
SW (FIG. 6A and the like): switch Referring to FIG. 4, "+" means addition of an output voltage. However, if the output voltages of addition terms have opposite phases, then the addition processing is performed after inverting the output voltage of one of the addition terms so that the value after the addition increases. For example, in "□: Hsen1+Hsen2," the output voltages of the piezoelectric sensors 43a and 43b are in opposite phases to each other, so that the detection unit 50 inverts the output voltage of the piezoelectric sensor 43b (− output voltage) and then adds the inverted output voltage to the output voltage of the piezoelectric sensor 43a (the output voltage of the piezoelectric sensor 43a+ (− the output voltage of the piezoelectric sensor 43b)).

The following can be understood from FIG. 4.
(a1) The added value of the output voltages of the piezoelectric sensors 43a and 43b is small in a region where the deflection angle γ is small (as a guideline, a region where the deflection angle is γ≤5° with a threshold value of) 5°. Therefore, the accuracy of detection of the deflection angle γ deteriorates.
(a2) In a region where the deflection angle γ is small, the output voltage of the second set 40 (□: Hact2 sensor) is larger than the added value of the output voltages of the piezoelectric sensors 43a and 43b. When the second set 40 is being used as a piezoelectric sensor, the reciprocating rotation of the mirror part 31 about the first axis is performed by only the first set 39.
(a3) In a region where the deflection angle γ is small, the added value of the output voltage of the second set 40 and the output voltage of one of the piezoelectric sensors 43a and 43b (□: Hact2 sensor+Hsen2) is the largest among the compared three ("◊," "□," and "□").

The optical scanning device 10 performs control based on the finding from FIG. 4. More specifically, in a control period during which the operation is carried out with the deflection angle width of the mirror part 31 set at a threshold value γa (e.g., γa=5°) or less, only one of the first set 39 and the second set 40 remains as the piezoelectric actuator and the other is used as a piezoelectric sensor rather than the piezoelectric actuator. Further, the deflection angle γ is detected by the detection unit 50 on the basis of one of (b1) the output voltage of the other (e.g., "□" of FIG. 4), (b2) the addition of the output voltage of the other and the output voltage of one of the piezoelectric sensors 43a and 43b (e.g., "□" of FIG. 4), and (b3) the addition of the output voltage of the other and the added value of the output voltages of the piezoelectric sensors 43a and 43b.

(Deflection Angle Detection Method)

FIG. 5 is a flowchart of the method of detecting the deflection angle γ in the optical scanning device 10. Before describing the flowchart, a specific circuit to which the detection method of the flowchart is applied will be described.

In this embodiment, there is one normal deflection angle mode (high deflection angle mode) while there are three low deflection angle modes 1 to 3. The normal deflection angle mode (the high deflection angle mode) is a deflection angle mode used in a first driving period, and is a deflection angle mode for controlling deflection angle when the deflection angle width of the mirror part 31 is a large deflection angle width exceeding the threshold value γa. On the other hand, the low deflection angle modes are deflection angle modes used in a second driving period, and are deflection angle modes for controlling deflection angle when the deflection angle width of the mirror part 31 is a small deflection angle width of the threshold value γa or less.

The relationship between the elements (piezoelectric bodies) used as (deflection angle) sensors in each deflection angle mode and the phase difference between the sensors (the difference in phase of the output voltage of a target element from the phase of the output voltage of a reference element) is as shown below.

TABLE 1

|  | Element used as sensor | Phase difference between sensors | | |
| --- | --- | --- | --- | --- |
| Normal deflection angle mode | Hsen1 + Hsen2 | Hsen1: Phase 0° | Hsen2: Phase difference 180° | — |
| Low deflection angle mode 1 | Hact2 sensor | Hact1 sensor: Phase 0° | — | — |
| Low deflection angle mode 2 | Hact2 sensor + Hsen2 | Hact1 sensor: Phase 0° | Hsen2: Phase difference 180° | — |
| Low deflection angle mode 3 | Hact2 sensor + Hsen1 + Hsen2 | Hact1 sensor: Phase 0° | Hsen1: Phase difference 0° | Hsen2: Phase difference 180° |

The relationship between the elements (piezoelectric bodies) used as (deflection angle) sensors in each deflection angle mode and the connection positions of SW (switches) 1 to 3 in the circuit diagram of FIG. 6A and the like to be described later is as shown below.

TABLE 2

|  | Element used as sensor | Connection position | | |
| --- | --- | --- | --- | --- |
|  |  | SW1 | SW2 | SW3 |
| Normal deflection angle mode | Hsen1 + Hsen2 | A | A | A |
| Low deflection angle mode 1 | Hact2 sensor | B | B | B |
| Low deflection angle mode 2 | Hact2 sensor + Hsen2 | B | B | A |
| Low deflection angle mode 3 | Hact2 sensor + Hsen1 + Hsen2 | B | A | A |

Figure 6A:
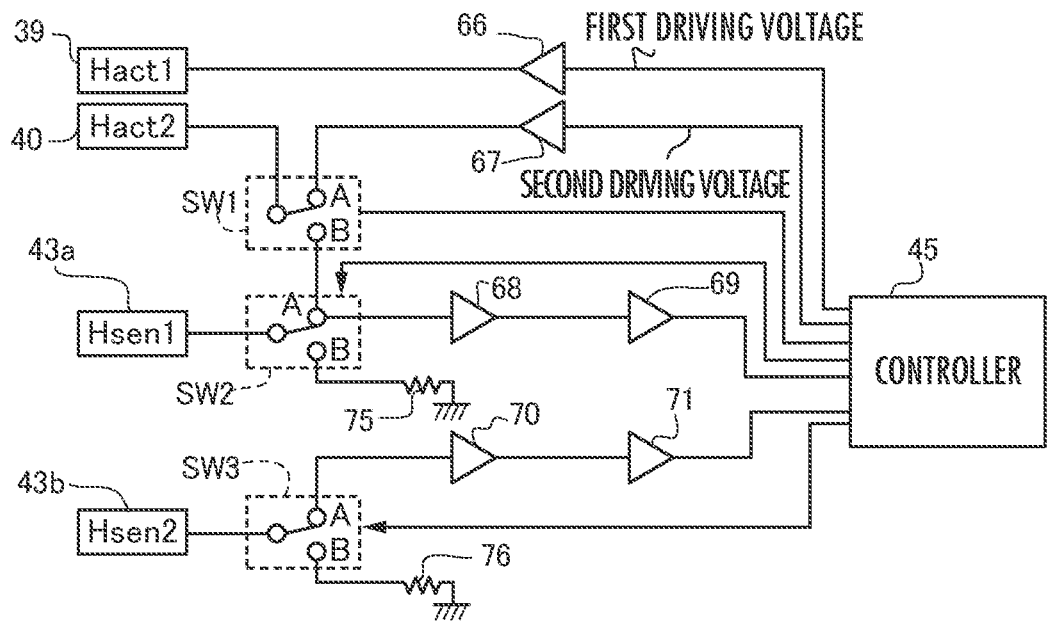
FIG. 6A is a diagram illustrating the connection state during a first driving period in an external circuit in which a low deflection angle mode is set to a low deflection angle mode 1.
Figure 6B:
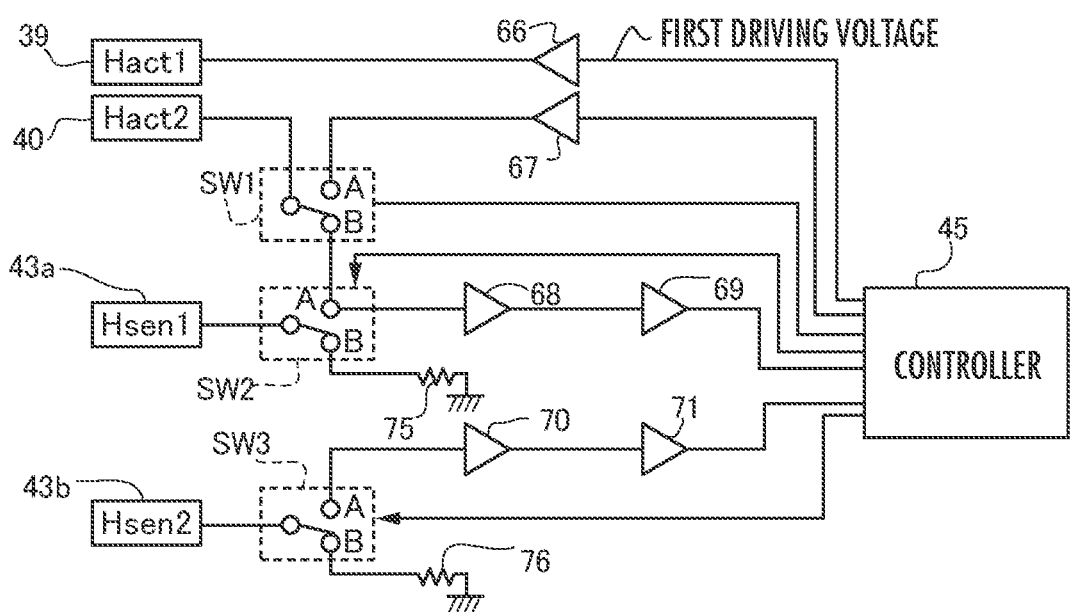
FIG. 6B is a diagram illustrating the connection state during a second driving period in the external circuit in which the low deflection angle mode is set to the low deflection angle mode 1.

FIG. 6A and FIG. 6B are diagrams illustrating the states in the first driving period and the second driving period in an external circuit in which the low deflection angle mode is set to the low deflection angle mode 1. FIG. 7 presents the waveform diagrams of the first driving period and the second driving period in the external circuit. The low deflection angle mode 1 corresponds to the detection method of (b1).

In FIG. 6A and FIG. 6B, the controller 45 controls the connection positions of the SW (switch) 1 to the SW3. Reference numerals 66 and 67 denote driving amplifiers. Reference numerals 68 to 71 denote sensor amplifiers. Reference numerals 75 and 76 denote resistors.

The controller 45 supplies the first driving voltage and the second driving voltage to the first set 39 and the second set 40 through the driving amplifiers 66 and 67, respectively. The output voltages of the second set 40 and the piezoelectric sensor 43a are sent to the controller 45 through the sensor amplifiers 68 and 69. The output voltage of the piezoelectric sensor 43b is sent to the controller 45 through the sensor amplifiers 70 and 71.

The SW1 connects the second set 40 to a contact A during the first driving period (FIG. 6A), i.e., when the second set 40 is used as a piezoelectric actuator, and connects the second set 40 to a contact B during the second driving period (FIG. 6B), i.e., when the second set 40 is used as a piezoelectric sensor. The SW2 and the SW3 are in the connection positions of the contact A and the contact B, respectively, during the first driving period and the second driving period.

In FIG. 7, the driving period of the H actuator 33 is switched from the first driving period to the second driving period at time t=t1. At the binary level of the SW1 to the SW3, "0" indicates that the connection position is at the contact A, and "1" indicates that the connection position is at the contact B.

In the first driving period, the first driving voltage and the second driving voltage are driving voltages having phases opposite from each other. This causes the mirror part 31 to rotate in a reciprocating manner about the first axis with a large deflection angle width. In other words, the scanning light beam Ls scans with a large scanning width in the H direction.

The piezoelectric sensors 43a and 43b curvedly deform in phases opposite from each other, and generate output voltages in phases opposite from each other in the first driving period. In the first driving period, the controller 45 (more specifically, the detection unit 50 of the controller 45) inverts the output voltage of the piezoelectric sensor 43b and adds the inverted o43a so as to detect the deflection angle γ in the first driving period on the basis of the value obtained after the addition (refer to "□" of FIG. 4). The deflection angle width in the first driving period is sufficiently large, so that the accuracy of detection of the deflection angle γ is sufficiently guaranteed.

In the second driving period, the SW1 and the SW2 are both set to the connection positions of the contact B. Thus, the H actuator 33 rotates the mirror part 31 about the first axis in a reciprocating manner by only the first set 39 of piezoelectric divided sections. Consequently, although the actuator force provided by the H actuator 33 is reduced by half, the mirror part 31 rotates about the first axis in a reciprocating manner without any difficulty at an instructed deflection angle width, because the second driving period is the period during which the mirror part 31 is rotated about the first axis in a reciprocating manner at a small deflection angle width.

Meanwhile, in the first driving period, all the SW1 to the SW3 are set to the connection positions of the contact B. Consequently, the output voltage of the second set 40 of piezoelectric divided sections is sent to the controller 45. The detection unit 50 of the controller 45 detects the deflection angle γ on the basis of the output voltage of the second set 40 of piezoelectric divided sections. The output voltage of the second set 40 of piezoelectric divided sections is larger than the output voltage of the added value of the piezoelectric sensors 43*a* and 43*b* (refer to the comparison between "□" and "◇" of FIG. 4), thus enabling the detection unit 50 to detect the deflection angle γ with sufficiency accuracy. Further, the piezoelectric divided sections 42*b*, 42*d* and 42*f* of the second set 40 are all positioned at locations farther apart from the torsion bar 32*b* than the piezoelectric sensors 43*a* and 43*b*, and are therefore prevented from coming off due to an excessive stress from the torsion bar.

The flowchart of FIG. 5 will be described. In S (step) 101, the driving unit 49 determines the deflection angle mode for rotating the mirror part 31 about the first axis in a reciprocating manner. There are two deflection angle modes, namely, the low deflection angle mode and the high deflection angle mode. More specifically, the driving unit 49 determines that a control period is in the low deflection angle mode when the mirror part 31 is rotated in a reciprocating manner with the deflection angle width of the deflection angle γ set to the threshold value γa or less, and determines that the control period is in the high deflection angle mode when the mirror part 31 is rotated in a reciprocating manner with the deflection angle width of the deflection angle γ set to be larger than the threshold value γa.

If the control period is determined to be in the low deflection angle mode, then the driving unit 49 advances the processing to S102. If the control period is determined to be in the high deflection angle mode, then the driving unit 49 advances the processing to S108.

First, the processing in the control period in the low deflection angle mode will be described. In S102, the driving unit 49 stops the output of the second driving voltage, and outputs only the first driving voltage to drive only the first set 39 of piezoelectric divided sections. As a result, the actuator force of the mirror part 31 is reduced by half, but the deflection angle width of the deflection angle γ required for the mirror part 31 during this period is small, thus causing no problem with the reciprocating rotation of the mirror part 31 about the first axis.

In S103, the connection switching unit 51 connects the piezoelectric sensors 43*a* and 43*b* to ground. More specifically, the connection switching unit 51 switches the connection positions of all the SW1 to the SW3 to the contact B, as illustrated in FIG. 6B. As a result, the output terminals of the piezoelectric sensors 43*a* and 43*b* are maintained at 0V (ground), thus preventing depolarization due to electric charge accumulation during the curved deformation.

Meanwhile, as the connection position of the SW1 changes from the contact A to the contact B, the function of the second set 40 switches from the piezoelectric actuator to the piezoelectric sensor.

In S104, the detection unit 50 detects the deflection angle γ on the basis of an output voltage Voa2 of the second set 40 of piezoelectric divided sections. As described in relation to "□" of FIG. 4, a sufficient magnitude of an output voltage of the detection unit 50 is ensured despite the low deflection angle mode of the mirror part 31. Therefore, the accuracy of detection of the deflection angle γ in the low deflection angle mode is guaranteed.

The processing in the control period of the high deflection angle mode will be described. In S108, the driving unit 49 drives the first set 39 and the second set 40 by the first driving voltage and the second driving voltage, respectively. During the high deflection angle mode control period, the connection switching unit 51 switches all the SW1 to the SW3 to the contact A (FIG. 6B).

In the H actuator 33, both the first set 39 and the second set 40 of piezoelectric divided sections are driven, thereby causing the H actuator 33 to output a large actuator force. This enables the mirror part 31 to rotate in a reciprocating manner about the first axis with a large deflection angle width.

In S109, the detection unit 50 detects the deflection angle γ on the basis of the added value of output voltages Vos1 and Vos2 of the piezoelectric sensors 43*a* and 43*b*. As described in relation to "□" of FIG. 4, the deflection angle width of the deflection angle γ in the high deflection angle mode is large. Therefore, the accuracy of detection of the deflection angle γ in the high deflection angle mode is guaranteed.

(Other Low Deflection Angle Modes)

Figure 8A:
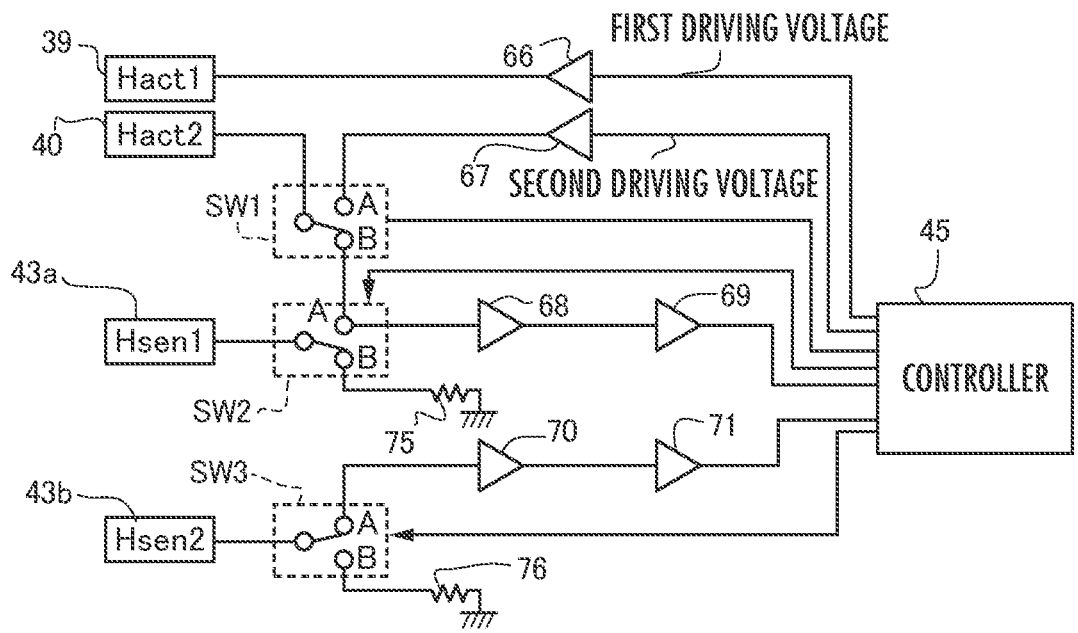
FIG. 8A is a diagram illustrating the connection state during the second driving period in an external circuit in which the low deflection angle mode is set to a low deflection angle mode 2.

FIG. 8A is a diagram illustrating the connection state in the second driving period in an external circuit in which the low deflection angle mode is set to the low deflection angle mode 2. The low deflection angle mode 2 corresponds to the detection method of (b2).

Figure 8B:
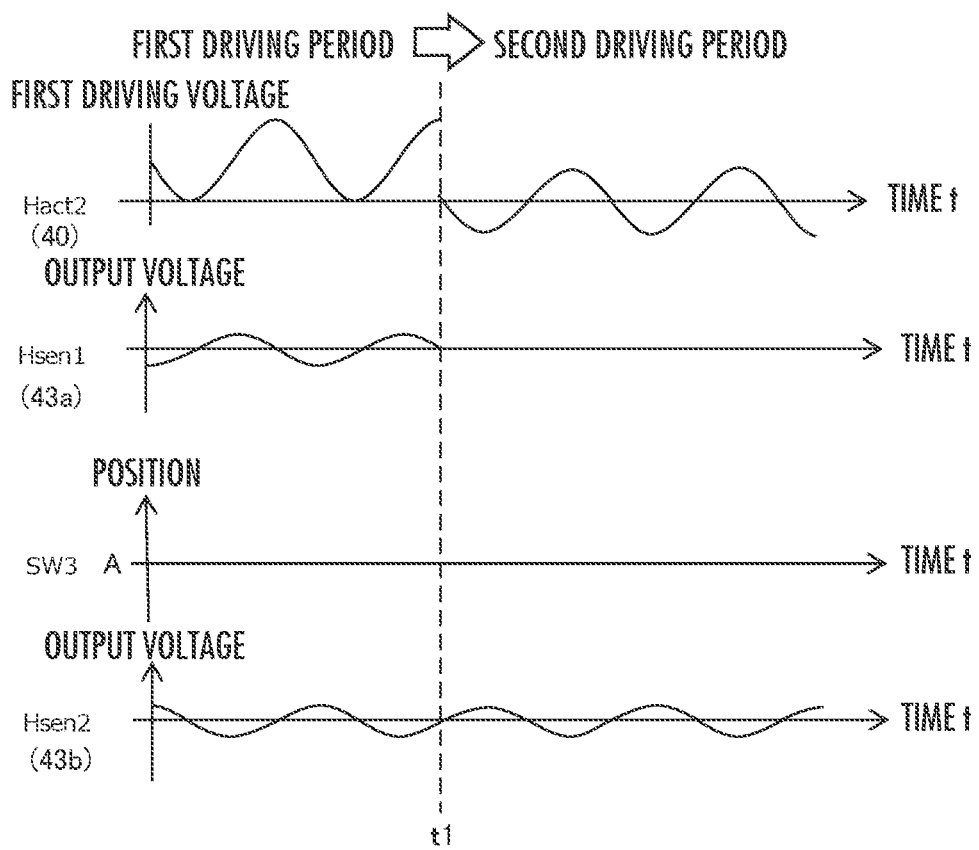
FIG. 8B is a waveform diagram of the second driving period in the external circuit of FIG. 8A.

FIG. 8B is a waveform diagram in the second driving period in the external circuit of FIG. 8A. The connection position during the first driving period in the controller 45 of FIG. 8A is the same as that in FIG. 6A, and therefore the illustration thereof is omitted. Further, the waveform diagram of the first set 39, the SW1, the SW2, and the piezoelectric sensor 43*a* during the first driving period in the controller 45 of FIG. 8A is the same as the waveform diagram thereof in FIG. 7, and therefore the illustration thereof is omitted.

Referring to FIG. 8A and FIG. 8B, the differences from FIG. 6B and FIG. 7 will be described. In the second driving period of FIG. 8A, the SW3 is set to the connection position of the contact A. Thus, the detection unit 50 detects the deflection angle γ on the basis of the added value of the output voltage of the second set 40 of piezoelectric divided sections and the output voltage of the piezoelectric sensor 43*b*.

The output voltage of the piezoelectric sensor 43*b* has a phase opposite from the phase of the output voltage of the second set 40 of piezoelectric divided sections. Therefore, the detection unit 50 inverts the output voltage of the piezoelectric sensor 43*b* before adding the output voltage to the output voltage of the second set 40 of piezoelectric divided sections.

Figure 9A:
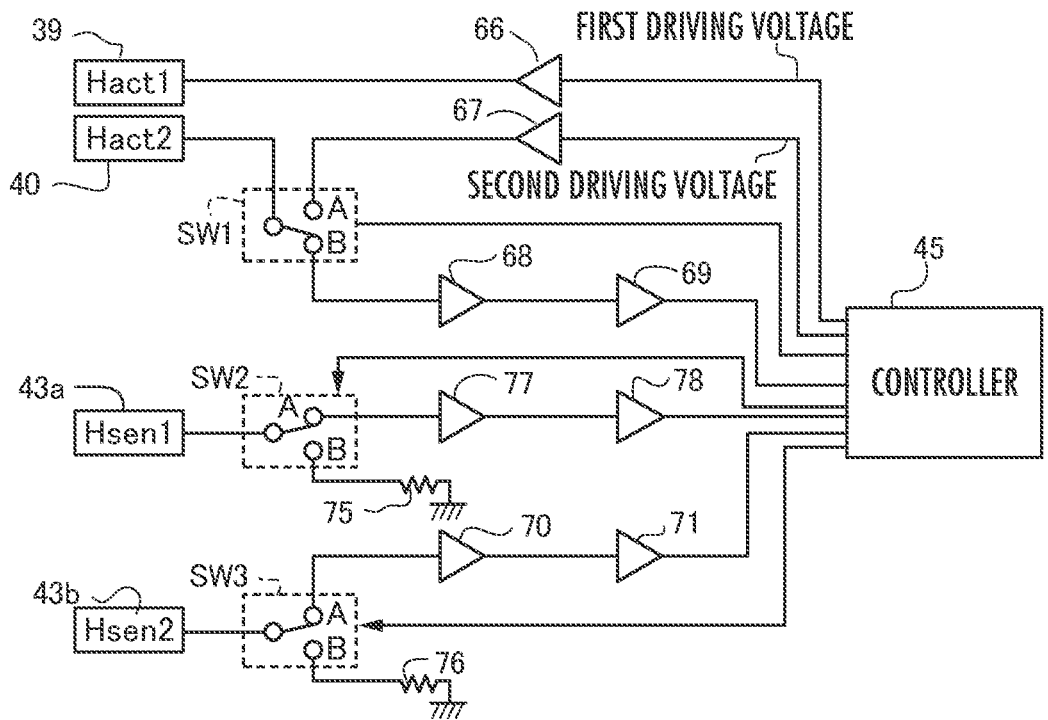
FIG. 9A is a diagram illustrating the connection state during the second driving period in an external circuit in which the low deflection angle mode is set to a low deflection angle mode 3.
Figure 9B:
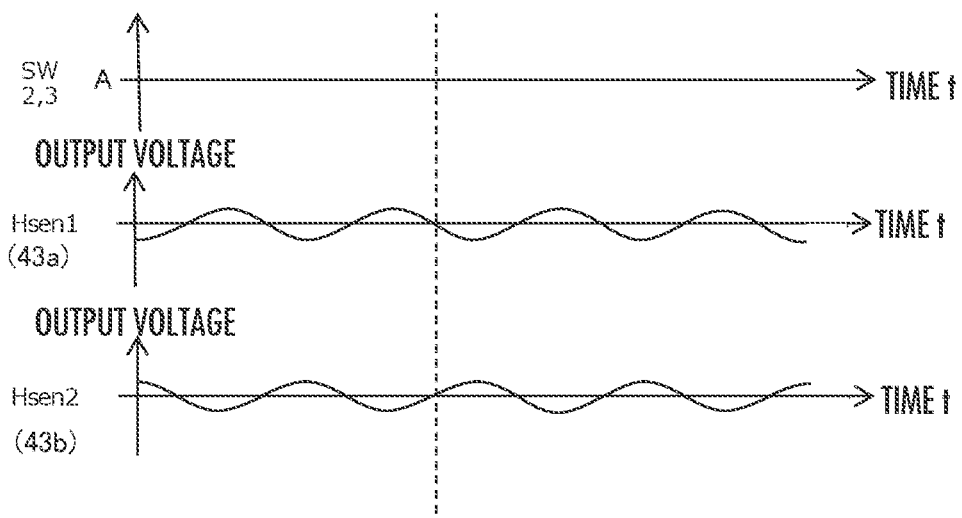
FIG. 9B is a waveform diagram in the external circuit of FIG. 9A.

FIG. 9A is a diagram illustrating the connection state during the second driving period in an external circuit in which the low deflection angle mode is set to the low deflection angle mode 3. The low deflection angle mode 3 corresponds to the detection method of (b3). FIG. 9B is a waveform diagram of the external circuit of FIG. 9A. The connection position during the first driving period in the controller 45 of FIG. 9A is the same as that in FIG. 6A, and therefore the illustration thereof is omitted. Further, the waveform diagram of the first set 39, the SW1, the SW2, and the piezoelectric sensor 43*a* during the first driving period in the controller 45 of FIG. 9B is the same as the waveform diagram thereof in FIG. 7, and therefore the illustration thereof is omitted.

Referring to FIG. 9A and FIG. 9B, the differences from FIG. 6B and FIG. 7 will be described. For the piezoelectric sensor 43*a*, dedicated sensor amplifiers 77 and 78 are prepared separately from sensor amplifiers 68 and 69 for the second set 40 of piezoelectric divided sections.

During the second driving period in FIG. 9A, both the SW2 and the SW3 have the connection positions thereof switched to the contact A. Thus, the detection unit 50 detects the deflection angle γ on the basis of the added value of the output voltage of the second set 40 of piezoelectric divided sections and the output voltages of the piezoelectric sensors 43*a* and 43*b*.

Figure 10:
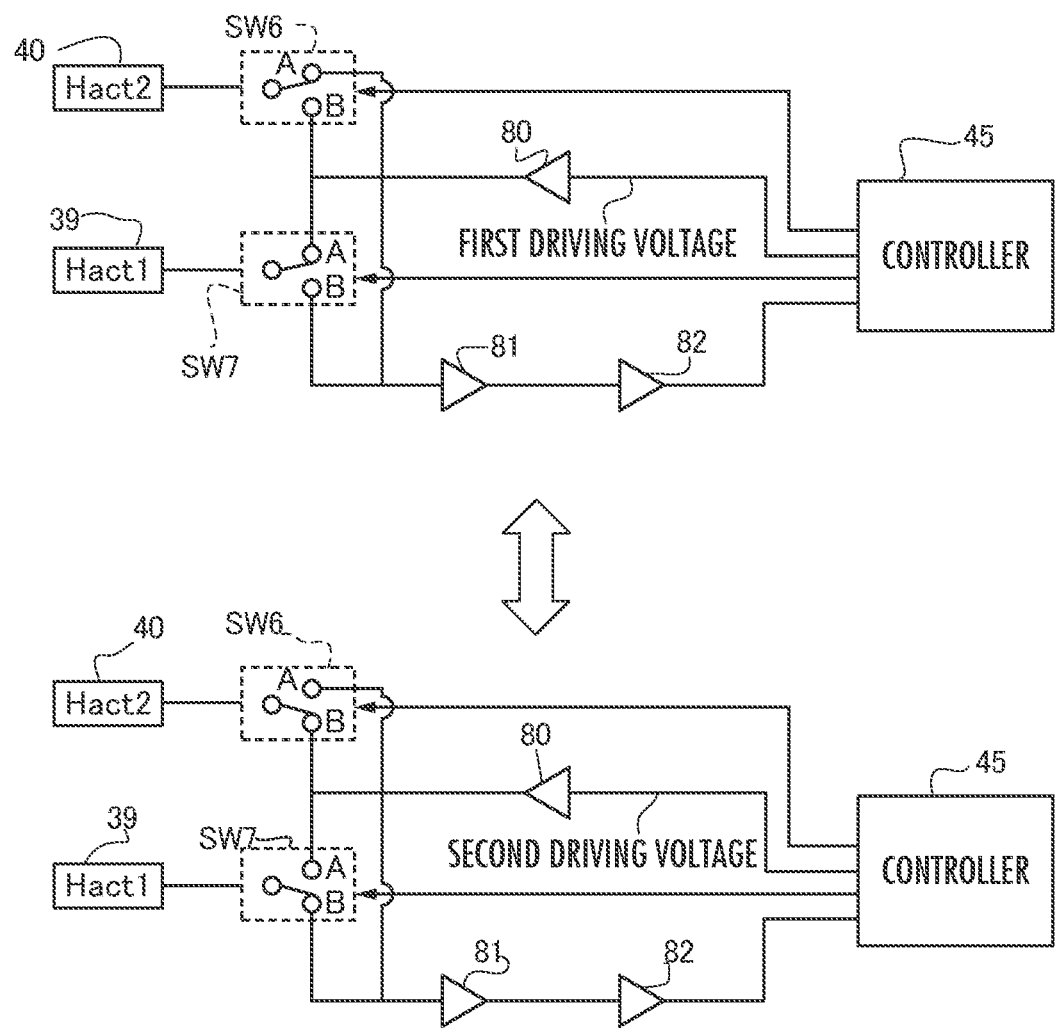
FIG. 10 presents circuit diagrams of a driving system that alternately switches a driven set and a non-driven set during the second driving period.

FIG. 10 presents circuit diagrams of a driving system that alternately switches a driven set and a non-driven set during the second driving period. In the following, operation periods are divided into a first operation period in which a driven set and a non-driven set during the second driving period are the first set 39 and the second set 40, respectively, and a second operation period in which the driven set and the non-driven set are the second set 40 and the first set 39, respectively. FIG. 11 is a diagram illustrating the comparison of the waveforms in the operation periods in the circuit of FIG. 10.

In FIG. 10, the connection positions of a SW6 and a SW7 are switched in response to control signals from the controller 45.

The upper diagram of FIG. 10 and the left half of FIG. 11 illustrate the connection positions and the waveforms in the first operation period, and the lower diagram of FIG. 10 and the right half of FIG. 11 illustrate the connection positions and the waveforms in the second operation period. The first operation period and the second operation period are switched alternately at, for example, fixed time intervals, in the second driving period.

During the first operation period, the connection positions of the SW6 and the SW7 are both set to the contact A. Thus, the first driving voltage is supplied to the first set 39, whereas the supply of the second driving voltage to the second set 40 is stopped. Consequently, in the H actuator 33, only the first set 39 of piezoelectric divided sections acts as the piezoelectric actuator, while the second set 40 of piezoelectric divided sections outputs, as the piezoelectric sensor, the output voltage according to the deflection angle γ. Further, the output voltage from the second set 40 and the output voltages from the piezoelectric sensors 43*a* and 43*b* are input to the detection unit 50, and the detection unit 50 detects the deflection angle γ on the basis of the output voltages from the three elements (piezoelectric bodies).

In the second operation period, the connection positions of both the SW6 and the SW7 are switched to the contact B. Consequently, the supply of the first driving voltage from the driving unit 49 to the first set 39 is stopped, whereas the supply of the second driving voltage from the driving unit 49 to the second set 40 is performed. As a result, in the H actuator 33, only the second set 40 of piezoelectric divided sections acts as the piezoelectric actuator, whereas the first set 39 outputs, as the piezoelectric sensor, an output voltage according to the deflection angle γ. Further, the output voltage from the first set 39 and the output voltages from the piezoelectric sensors 43*a* and 43*b* are input to the detection unit 50, and the detection unit 50 detects the deflection angle γ on the basis of the output voltages from the three elements (piezoelectric bodies).

In this embodiment, the driven set and the non-driven set are alternately switched between the first set 39 and the second set 40 in the second driving period thereby to cause each piezoelectric divided section to repeatedly operate and stop the piezoelectric actuator alternately, thus improving the life thereof.

Modified Examples

In the optical deflector 30 of the embodiment, the pair of piezoelectric sensors 43 are provided on both sides of the first axis in at least one coupled portion (e.g., the coupled portion adjacent to the torsion bar 32*b*) of the two coupled portions that couple the H actuator 33 to the torsion bar 32. In the present invention, it is possible to provide a pair of the piezoelectric sensors 43 also in the other coupled portion (e.g., the coupled portion adjacent to the torsion bar 32*a*) to detect the deflection angle γ from the output voltages of the two pairs of piezoelectric sensors 43.

The optical deflector 30 of the embodiment is a two-axis optical deflector. The optical deflector installed in the optical scanning device in accordance with the present invention may be a single-axis optical deflector.

The H actuator 33 of the embodiment is formed in the annular shape. The piezoelectric actuators installed in the optical scanning device in accordance with the present invention may be linear (non-annular) piezoelectric actuators coupled to both sides of each torsion bar, as in Patent Literature 1.

As the combination of output voltages based on which the deflection angle γ is detected, FIG. 4 of the embodiment illustrates only one, namely, Hact2 sensor+Hsen2. The combination in the present invention may be any one of the following other combinations, such as (c1) Hact2 sensor+Hsen1, (c2) Hact2 sensor+Hsen1+Hsen2, (c3) Hact2 sensor+Hsen2, (c4) Hact1 sensor+Hsen1, and (c5) Hact1 sensor+Hsen1+Hsen2.

In the embodiment, the movable frame 34 as the support part has the annular shape surrounding the mirror part 31. In the present invention, the support part does not have to have the annular shape surrounding the mirror part from the outer side. The support part of the present invention may be constructed to support the mirror part from one side.

DESCRIPTION OF REFERENCE NUMERALS

10 . . . optical scanning device; 20 . . . laser light source; 30 . . . optical deflector; 31 . . . mirror part; 32*a* and 32*b* . . . torsion bar; 33 . . . . H actuator (annular piezoelectric actuator); 34 . . . movable frame (support part); 39 . . . first set; 40 . . . second set; 42*a* to 42*f*: piezoelectric divided section; 43*a*, 43*b* . . . piezoelectric sensor; 45 . . . controller; 49 . . . driving unit; 50 . . . detection unit; and 51 . . . connection switching unit.

output voltage to the output voltage of the piezoelectric sensor

The invention claimed is:

1. An optical scanning device comprising:
an optical deflector which has a mirror part, a support part, and a plurality of piezoelectric divided sections coupled in series, and includes a piezoelectric actuator which is interposed between the support part and the mirror part and rotates the mirror part about a rotation axis in a reciprocating manner;
a driving unit which supplies a first driving voltage and a second driving voltage to a first set and a second set of piezoelectric divided sections so as to provide a relationship of opposite phases from each other in the case where the plurality of piezoelectric divided sections are divided alternately into the first set and the second set in an arrangement order toward an acting end from a proximal end of the optical deflector; and a detection unit that detects a deflection angle of the mirror part about the rotation axis, wherein the driving unit supplies a driving voltage to both the first set and the second set of piezoelectric divided sections during a first driving period, and supplies a driving voltage only to one of the first set and the second set of piezoelectric divided sections during a second driving period, and the detection unit detects the deflection angle based on an output voltage of the other set of piezoelectric divided sections during the second driving period.

2. The optical scanning device according to claim 1, wherein the support part annularly surrounds the mirror part, the optical deflector has a pair of torsion bars which protrude from both sides of the mirror part and are coupled to the support part, and the piezoelectric actuator is an annular piezoelectric actuator which annularly surrounds the mirror part on an inner peripheral side of the support part, is coupled to an intermediate portion of the pair of torsion bars on a first axis serving as the rotation axis, and is coupled to the support part on a second axis orthogonal to the first axis at a center of the mirror part.

3. The optical scanning device according to claim 2, further comprising:

a pair of piezoelectric sensors placed so as to sandwich the first axis from both sides on at least one coupled portion of coupled portions of the annular piezoelectric actuator coupled to the pair of torsion bars, wherein the detection unit detects the deflection angle based on output voltages of the pair of piezoelectric sensors during the first driving period.

4. The optical scanning device according to claim 3, wherein the detection unit detects the deflection angle based on a sum of an output voltage of the other set of piezoelectric divided sections and output voltages of the pair of piezoelectric sensors during the second driving period.

5. The optical scanning device according to claim 3, further comprising:

a connection switching unit which connects an output terminal of at least one of the pair of piezoelectric sensors to ground during the second driving period.

6. The optical scanning device according to claim 5, wherein the connection switching unit alternately switches the other set between the first set and the second set during the second driving period.

* * * * *